E. T. STARR.
BALL AND SOCKET JOINT.

No. 169,383. Patented Nov. 2, 1875.

WITNESSES
Harry King
F. W. Howard

Eli T. Starr, INVENTOR
By his Attorney
Wm. D. Baldwin

UNITED STATES PATENT OFFICE.

ELI T. STARR, OF PHILADELPHIA, PENNSYLVANIA, ASSIGNOR TO SAMUEL S. WHITE, OF SAME PLACE.

IMPROVEMENT IN BALL-AND-SOCKET JOINTS.

Specification forming part of Letters Patent No. 169,383, dated November 2, 1875; application filed June 24, 1875.

*To all whom it may concern:*

Be it known that I, ELI T. STARR, of the city and county of Philadelphia, in the State of Pennsylvania, have invented a certain new and useful Improvement in Ball-and-Socket Joints, of which the following is a specification:

My invention relates to ball-and-socket connections of that class in which the ball forms the pivot of a support. Its purpose is to render the object supported freely adjustable in various directions, while capable of being secured firmly in any desired position by means of a single clamping-screw. These ends I attain by mounting the object to be supported on a rod or bar fitting snugly, but capable of turning and moving freely endwise, in a perforated slotted ball turning freely in a socket in a bracket or supporting-frame, and clamped by a set-screw in any position desired.

The subject-matter claimed will hereinafter specifically be set forth.

In the accompanying drawings my improvements are shown as adapted for supporting the head-rest of a dentist's chair.

Figure 1:
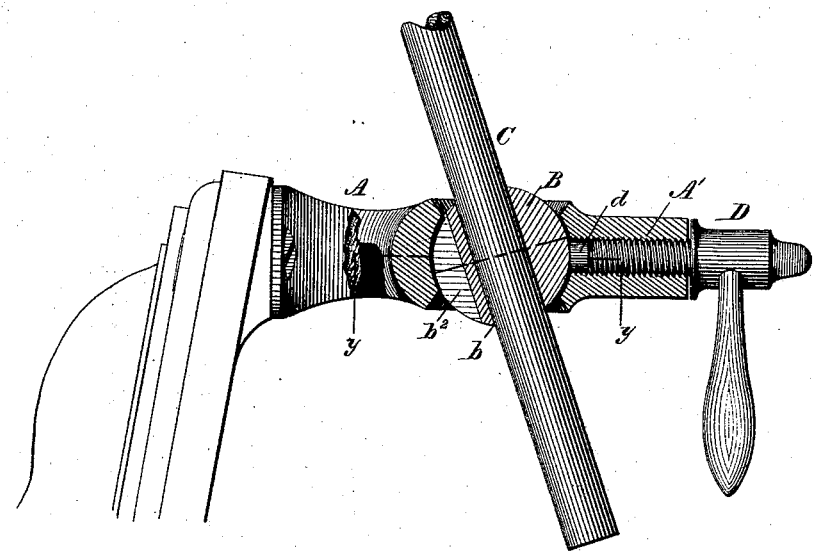
Figure 2:
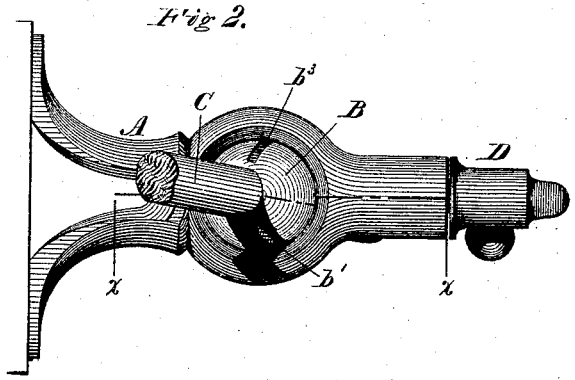
Figure 3:
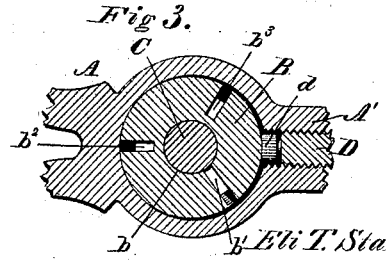

Figure 1 represents a vertical central section on the line $x\ x$ of Fig. 2 through so much of the apparatus as is necessary to illustrate the subject-matter herein claimed; Fig. 2, a plan or top view thereof, and Fig. 3 a transverse section through the joint on the line $y\ y$ of Fig. 1.

The casing or socket A is shown in the drawing as constructed in the form of a bracket adapted to be secured to the frame of a dentist's chair or other suitable support. The ball B, inclosed within this socket, is perforated, and its walls are also slotted. In this instance three radial slots, $b^1\ b^2\ b^3$, are shown, one, $b^1$, only of which extends through the wall of the ball to its central opening $b$, thus dividing the ball at that point, and rendering its walls compressible, yielding, or elastic. The rod C, upon which the head-rest or other object to be supported is mounted, fits snugly, but turns and moves freely endwise, in the opening through the ball. The openings in the case, through which the rod projects, are beveled or flared outward, so as to give a wide range of motion to the rod. A set-screw, D, working in a nut, A', forming an extension of the bracket or casing, forces a shoe, $d$, against the periphery of the ball when it is desired to compress it in its socket and secure the rod in its adjusted position.

It will be obvious from the foregoing description that by my improvement a head-rest supported upon the rod C can be raised or lowered vertically, adjusted horizontally by turning the rod axially in its bearings, and can also be swung laterally into any desired position by rocking the ball in its socket, and when so adjusted can be securely fixed in the desired position by the clamp-screw, which serves both to secure the ball in the desired position and to clamp it tightly around the rod.

I claim as my invention—

The ball-and-socket pivot-joint hereinbefore described, consisting of the combination of a socket, a perforated slotted ball rocking therein, a supporting-rod turning and moving in said ball, and a clamp-screw, these members being constructed and operating in combination, substantially as set forth, whereby the rod may be adjusted and clamped in the ball.

In testimony whereof I have hereunto subscribed my name.

ELI T. STARR.

Witnesses:
J. A. B. WILLIAMS,
S. T. JONES.